D. M. CHURCH.
RAILWAY SWITCH.
No. 11,390.
Reissued Nov. 21, 1893.
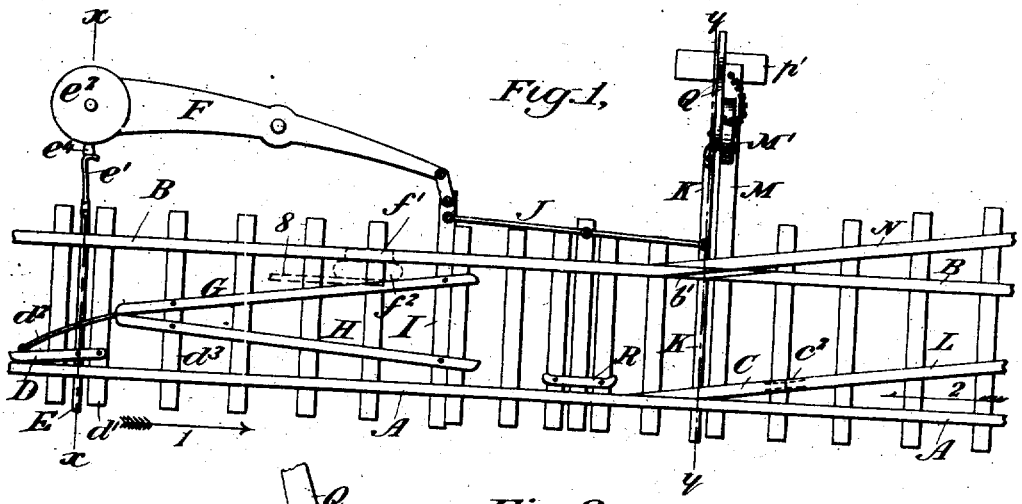
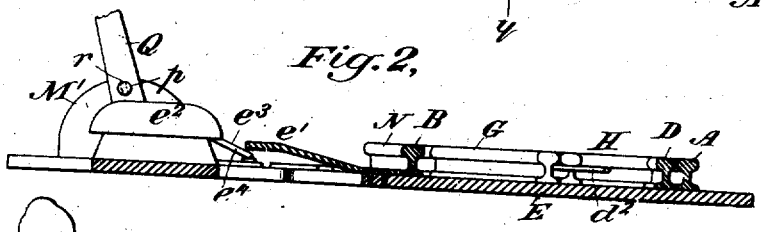
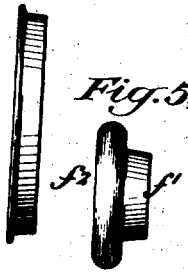
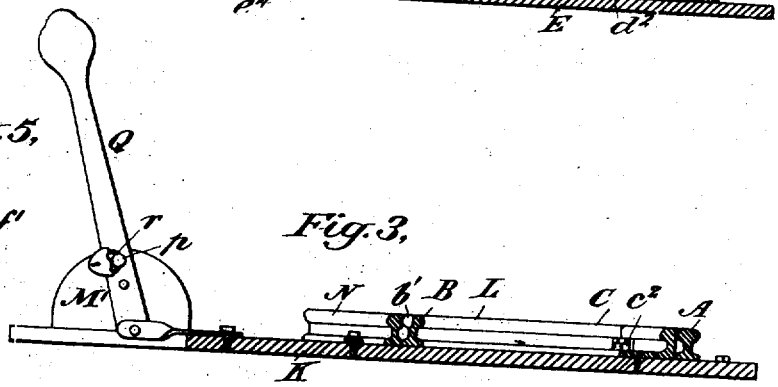
Fig. 6.
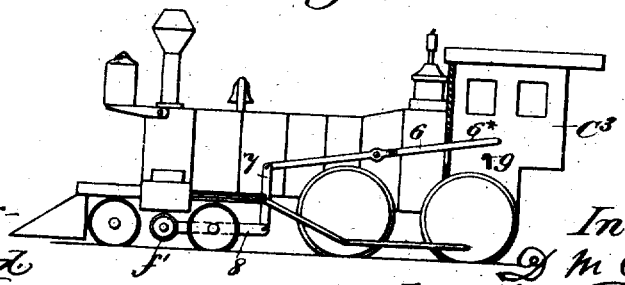
Witnesses:-
D. N. Hayford
M. E. Carter
Inventor:
D. M. Church
By atty
D. N. McIntire

UNITED STATES PATENT OFFICE.

DWIGHT M. CHURCH, OF WILLIMANTIC, CONNECTICUT, ASSIGNOR OF SEVEN TWENTY-FOURTHS TO ARTHUR C. ANDREW, OF WINDHAM, CONNECTICUT, AND OF EIGHT TWENTY-FOURTHS TO EDGAR B. FOSS, OF BAY CITY, MICHIGAN.

RAILWAY-SWITCH.

SPECIFICATION forming part of Reissued Letters Patent No. 11,390, dated November 21, 1893.

Original No. 464,061, dated December 1, 1891. Application for reissue filed October 14, 1893. Serial No. 488,171.

*To all whom it may concern:*

Be it known that I, DWIGHT M. CHURCH, of Willimantic, in the county of Windham and State of Connecticut, have invented certain new and useful Improvements in Railway-Switches; and I hereby declare the following to be such a full, clear, and exact description thereof as will enable those skilled in the art to which my invention relates to make and use the same, reference being had to the accompanying drawings, which form part of this specification.

My invention has for its objects the prevention of accidents, caused by misplaced switches, and the fixing of the responsibility where it belongs, when an accident caused by a switch occurs.

My invention consists in certain novel combinations of devices, which will be found hereinafter fully described, and which will be most particularly pointed out and clearly defined in the claims of this specification.

In the drawings which serve to illustrate my invention, Figure 1 is a plan view of sufficient of a main track, and a side track branching therefrom, to show my invention applied thereto. Fig. 2, is a cross-section, on an enlarged scale, at the line $x$, $x$, of Fig. 1. Fig. 3, is another cross-section on the same scale, at the line $y$, $y$, of Fig. 1. Fig. 4 is an edge view, on the same scale, of an ordinary car wheel. Fig. 5, is an edge view, on the same scale, of the switch-opening wheel. Fig. 6 is a view illustrating one way of operating, from a locomotive, my improved switching device.

A and B are portions of the two straight parallel rails of a main track; while L and N, are portions of the rails of a branch track, or siding, running out of the main track, as illustrated.

C is, in the case shown, the only switch-point used, which, although rigid, is flexibly connected, preferably by means of fish-plates $C^2$, to the rail L of the siding.

D is a lever fulcrumed, at one end, on a cross-tie $d'$, and connected, as shown, to a slide-bar E, which is arranged to slide beneath the track rails, and which has, at its extremity outside of the track, a projection $e'$ adapted, when the slide is pushed outward, to put into action, in any suitable manner, an alarm-bell $e^2$. A simple means for effecting this, is for the said projection to bear, when pushed outward, on an incline $e^3$ (see Fig. 2), on a lever $e^4$, which lever may either directly act as a bell-clapper within the bell, or to release a detent, which will allow a clockwork, or other mechanism, within the bell, to come into action, to ring the latter. The bell is on one end of a lever F, which, as shown, is fulcrumed at, or about, its middle, to a fixed point, and has its other end connected with a slide I arranged transversely of and beneath the track rails, as shown. A light spring $d^2$ serves to retract the lever D, or restore it to its normal position. I will here state, somewhat in advance, that the object of this lever D, is that when the switch C, is closed against the inner side of the main track rail A and a car comes along, moving in the direction of the arrow marked $l$, the side flange of the locomotive wheel enters between lever D and the inside of rail A, and thereby moves the slide E, to cause the bell $e^2$ to ring, thus announcing to the ear of the engineer that the switch ahead of him is closed to the main track, whether he had been aware of it, or not, from any signal ahead of him, that would appeal only to the eye. The engineer being thus apprised that the switch is thus closed, now presses downward, through the medium of suitable devices, a lever with which the locomotive is provided, and on the forward end of which is a small wheel $f'$ (see Fig. 6) having a flange $f^2$ (see dotted lines at Fig. 1) like, but somewhat thicker than, the flanges of the car wheels, and this flange $f^2$ entering between the lever G and the adjacent main track rail B, effectuates the opening of the switch C, so that the train will pass along on the main track. This setting of the switch is effected as follows:—Levers G and H are each pivoted, near one end, to the cross-sleeper, or tie $d^3$, and are both connected, near their other ends, to a slide-bar I, which, like the slide E, is arranged to move between the cross-sleepers and beneath the rails of the main track, and in one position of these parts lever G has that end which is attached to the slide-bar I very near to the inner side of the rail B, while in the other position of said parts, the lever H has one of its ends very near to the inside of the other rail A. Another lever J, centrally fulcrumed to a fixed point, is pivoted, at one end, to the said slide I, while its other end is pivoted to a slide K, which also works transversely of and beneath the track-rails, and this slide K is connected to and actuates the switch-rail C. The flange $f^2$ of wheel $f'$, entering between the lever G and the rail B, causes slide I to move the lever J, which, in turn, actuates slide K, and thus opens the switch C to the main track. If the switch C be held open, and it be desired to close it to the main track, and open it to the siding, the engineer on the locomotive lets down another small flanged wheel, like $f'$; but located at the opposite side of the locomotive, between the lever H and rail A, whereby, through the medium of the mechanism just described, the switch C will be closed to the main track, and the engine and cars will pass therefrom on to the tracks L and N of the siding. The bell indicates to the engineer the position of the switch, even though there should be no switch signal to appeal to his eye, or if it should be too dark, or foggy, for him to see the signal, or if the switch light used at night should be extinguished, and hence, invisible.

The switch rail C may be connected to the fixed rail L of the siding in any suitable manner; but, preferably, the connection is made by the long fish-plates $C^2$, which readily yield enough to allow the requisite small movement of the switch-point.

By my invention I have also provided means whereby, even when the switch-signal is locked, the switch may be operated at the will of the engineer by a device on the locomotive, though it cannot be operated by a tramp, or meddler. These novel means are as follows:—The signal-lever Q is pivoted on an upright projection, or stand M′ on a very heavy bar M, which is located transversely of the track, and beneath the rails thereof. The same pin $p$ which serves to lock the signal-lever Q, in a well known manner (as, for instance, by fastening a pad lock in the hole $r$ of the pin), also serves, when desired, to fasten the heavy bar, or slide, M to a tie timber, or other convenient fixed part, as indicated at $p'$ in Fig. 1. This slide M being of iron and so heavy, that even when not so locked, or fastened down to the road bed, it can only be moved, or slid lengthwise, by means of the device on the locomotive actuating one, or the other of the levers G and H, and through the medium of devices which connect said levers with the bar K; and when the switch-lever connected to said bar K may be locked to the stand M′ of the said bar M. When the signal-lever Q is not locked to the stand M′, the latter is held stationary by the gravity of the sliding bar M, so that the switch-man can then operate the switch by means of the said signal-lever. As the parts E, I, K, and M are all arranged to slide beneath the track rails, they are thus securely held against any tendency to rise up, or get out of order.

R is a short stationary guard-rail, fastened to the sleepers, or ties, to prevent the wheels from going wrong—that is, to guard their flanges, and prevent them from entering where they should not.

Fig. 6 is illustrative of one way in which the wheel $f'$ may be put into action by the engineer while on the locomotive. A lever 6, the treadle, or handle, of which extends into the cab $C^3$, is connected by a link 7, to a lever 8 (shown as pivoted on one of the locomotive axles) that carries, at its forward end, the small wheel $f'$, and the engineer can operate the lever 6 either by foot, or hand, as preferred; and if it be desired to keep, or hold, this part $f'$ down in a position to run on the track all the time, the handle, or treadle, end 6* may be held by a hook 9.

What I claim as new, and desire to secure by Letters Patent, is—

1. In a railway switch mechanism, the combination, with the switch-point, of slides K and I; a lever J, connecting said slides; the levers G and H; and wheels carried by the locomotive, having flanges thicker than those of car wheels, and adapted to actuate the levers G and H; substantially as hereinbefore set forth.

2. The combination with a switch-setting mechanism; and a lever F, carrying an alarm bell and operating to set said bell in a position to be acted upon when the switch is in a certain condition, of a slide E, adapted to act on said bell; and a lever D, operating to actuate said slide, and adapted to be vibrated on its fulcrum by the flange of an engine, or car wheel, traveling on the track; all substantially as and for the purpose set forth.

3. The combination with the switch of a rail-road; and a mechanism for operating the same, by the action upon said mechanism of a device on the locomotive, of the switch-bar K; the hand and signal-lever Q connected to said bar; and the bar M, to the upward projection M′ of which said lever Q is fulcrumed and may be locked; the combination being such, as described, that, even when locked against movement by hand power, the switch may be set, or adjusted, by means of the said device on the locomotive; for the purpose set forth.

In witness whereof I have hereunto set my hand this 9th day of October, 1893.

DWIGHT M. CHURCH.

In presence of—
F. W. McCOY
JOHN C. KING.